July 19, 1949.  R. WILLIAMS  2,476,395
APPARATUS FOR THE CENTRIFUGAL MOLDING OF
SOLID ARTICLES FROM PLASTIC MATERIALS
Filed July 1, 1948  2 Sheets-Sheet 1

INVENTOR
RALPH WILLIAMS

July 19, 1949.    R. WILLIAMS    2,476,395
APPARATUS FOR THE CENTRIFUGAL MOLDING OF
SOLID ARTICLES FROM PLASTIC MATERIALS
Filed July 1, 1948    2 Sheets-Sheet 2

INVENTOR
RALPH WILLIAMS
by Richardson and David
ATTYs

Patented July 19, 1949

2,476,395

UNITED STATES PATENT OFFICE 2,476,395

APPARATUS FOR THE CENTRIFUGAL MOLD-
ING OF SOLID ARTICLES FROM PLASTIC
MATERIALS

Ralph Williams, Strathfield, near Sydney,
New South Wales, Australia

Application July 1, 1948, Serial No. 36,394
In Australia November 21, 1945

8 Claims. (Cl. 25—41)

1

This invention has relevance to improvements in apparatus for the centrifugal moulding of solid articles from plastic materials. The plastic substance may be concrete or other plastic substance.

Said improved apparatus has a plurality of separate moulds formed integrally with a frame to be rotated on a shaft. The moulds are open at one end. Each of them also has a replaceable bottom which is slidable in the co-operative moulds to enable discharge of moulded articles from the moulds. There are also means for ejecting said articles on said bottoms from said moulds, and means for screeding material in said moulds.

The frame may have annular end plate members which are bridged by side plates, one of such members being secured to a disc which is secured to the rotatable shaft; in such construction the plurality of moulds are disposed circumferentially of the end plates, whereby the frame will be polygonally shaped with open ended hollow polygonally shaped chamber therein.

Replaceable bottoms of the moulds can rest upon flanges on the annular end plate members of the frame. In such case, one of such members can have adjustable clamping screws for temporarily securing the mould bottoms in the moulds and remotely disposed from the central axis of the frame.

With the frame of the apparatus there may be associated spring loaded means adapted when in engagement with the frame, during its rotation, to give it vibrating action and so impart concussion to the moulding material in the moulds. Means are also provided for holding the frame against rotation.

Filling of the separate moulds with moulding material is achievable while the frame is slowly rotated. Subsequently the speed of rotation of the frame can be increased to displace excess water and occluded air from the moulding material in the moulds.

With the apparatus can also be associated ejecting means for the slidable bottoms from the separate moulds and the moulded articles thereon, to permit the said bottoms after removal of moulded articles therefrom to be replaced in their respective moulds for further use therein.

Other features of the invention are hereinafter referred to.

With the object of having the invention better understood reference is made by way of example to the accompanying drawings showing one construction of the apparatus, and in which:

Fig. 1 is a perspective view;

2

Figure 1:
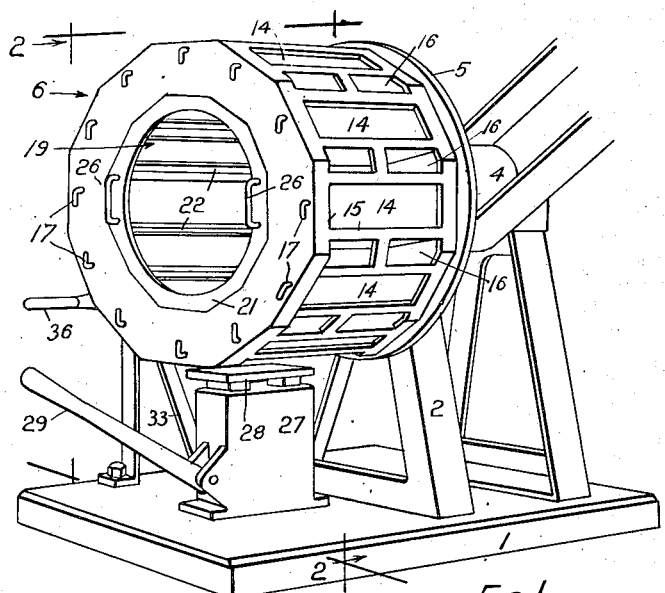

In the drawings, the apparatus is shown with a bed plate 1 having bearing brackets 2 for a horizontally disposed rotatable shaft 3. The latter may be driven through a pulley 4 which is secured thereto. There is rigidly secured to one end of the shaft 3 a circular plate 5. Concentrically and securely mounted on one face of the plate 5 is a polygonal shaped frame 6 which has a plurality of spaced, say rectangular, shaped mould boxes 7. The frame 6 has a pair of spaced annular plates 9 and 10 which are bridged by longitudinal members 11. Members 11 form the side walls of the boxes 7. The plates 9 and 10 respectively form the end walls of the boxes 7 and such plates respectively have inner polygonal shaped peripheries 12 and 13. Plate 9 of the frame 6 is rigidly secured to the plate 5.

Each of the mould boxes 7 has a pallet 14, the separate pallets 14 forming the separate bottoms of the boxes 7. The pallets 14 are loosely mounted in their respective boxes 7. The pallets 14 rest upon flanges 15 on the inner sides of the plates 9 and 10 forming the end walls of the boxes 7. Pallets 14 are thus remotely disposed from the central axis of the polygonal frame 6. Pallets 14 are firmly held in position on the plates 9 and 10 by the manually operable clamping screws 17, which co-operate with tapped openings 18 in the plate 10. As the mould boxes 7 form part of the polygonal frame 6 there are V-shaped recesses 16 on the outer periphery of the frame 6. The outer ends of the boxes 7 are open and face the central axis of the frame 6. There is thus formed a hollow polygonal shaped chamber 19 centrally of the frame 6.

Figure 2:
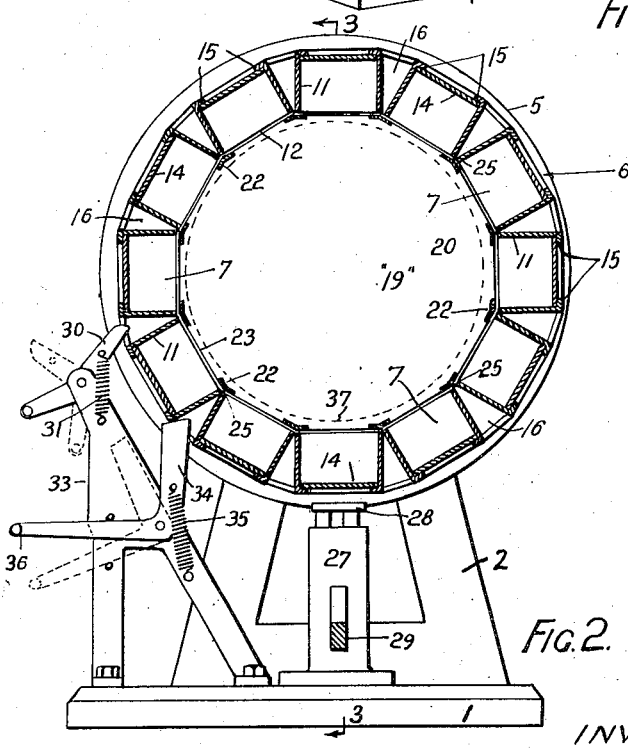
Fig. 2 is a cross-sectional elevation on plane 2—2, Fig. 1.

There is slidably mountable in the chamber 19 a screed consisting of the disc 20 and an annular disc 21. Both the discs 20 and 21 are spaced apart and are secured together by angle members 22. The discs 20 and 21 are formed respectively with polygonal peripheries 23 and 24 which correspond in number with the mould boxes 7, registering with the peripheral edges 12 and 13 respectively of the plates 9 and 10. The members 22 are affixed to the discs 20 and 21 so that each member 22 will be adapted to slide on the adjacent longitudinal edges 25 of the side walls 11 of the mould boxes 7 (Fig. 2). Upon the said screed being inserted in the chamber 19 its disc 20 will abut the plate 5 and its periphery 23 will register with the peripheral edge 12 of the plate 9. The annular disc 21 will simultaneously be in alignment with the plate 10 and its peripheral edge 24 will register with the peripheral edge 13 of the plate 10. On the outer face of the plate 10 are a pair of handles 26 whereby the said screed can be manipulated.

On the bed plate 1 and positioned below the lowermost mould box 14 is an ejector 27 which has a plunger 28 operable by a bell-crank lever 29 (Fig. 2).

The polygonal shaped frame 6 has on one side thereof a spring loaded radial arm 30 (Fig. 2) The arm 30 is held in engagement with the frame 6 by coil spring 31. Upon the frame 6 being rotated, vibrating action is given thereto. Spring 31 is designed and arranged so that when the radial arm 30 is disposed in its disengaged position it will be maintained therein. Radial arm 30 is pivoted on a bracket 33 fixed to the bed-plate 1. On the bracket 33 is also pivotally mounted a spring loaded pawl 34 which is adapted to engage when desired with the respective V-shaped recesses 16 of the frame 6 to hold the frame 6 from rotation. Spring 35 functions to hold the pawl 34 in or out of action. Pawl 34 has a manually operable handle 36. The spring loaded radial arm 30 may or may not be used when moulding operations are being performed on the apparatus.

In operation, upon the pawl 34 having been placed in inoperative position in relation to the frame 6 (dotted lines Fig. 2), the radial arm 30 is placed in engagement with the frame 6 if such arm is to be used. The frame 6 can then be rotated by driving the shaft 3 through its pulley 4. As the frame 6 is being slowly rotated its boxes 7 are suitably fed with the plastic material until such boxes are completely filled as indicated by the circle 37 in dotted lines (Fig. 2).

The speed of the frame 6 is now increased and excess water and occluded air will be expelled from the plastic material in the mould boxes 7. If the radial arm 30 is used, this will assist in such expulsion by vibrating the frame 6 in imparting concussion to the material in the mould boxes 7. On completion of the moulding operation of the apparatus as described rotation of the frame 6 can be stopped and the screed means described can be manually reciprocably operated, whereby excess plastic material in the mould boxes 7 can be removed through the open end thereof.

Figure 3:
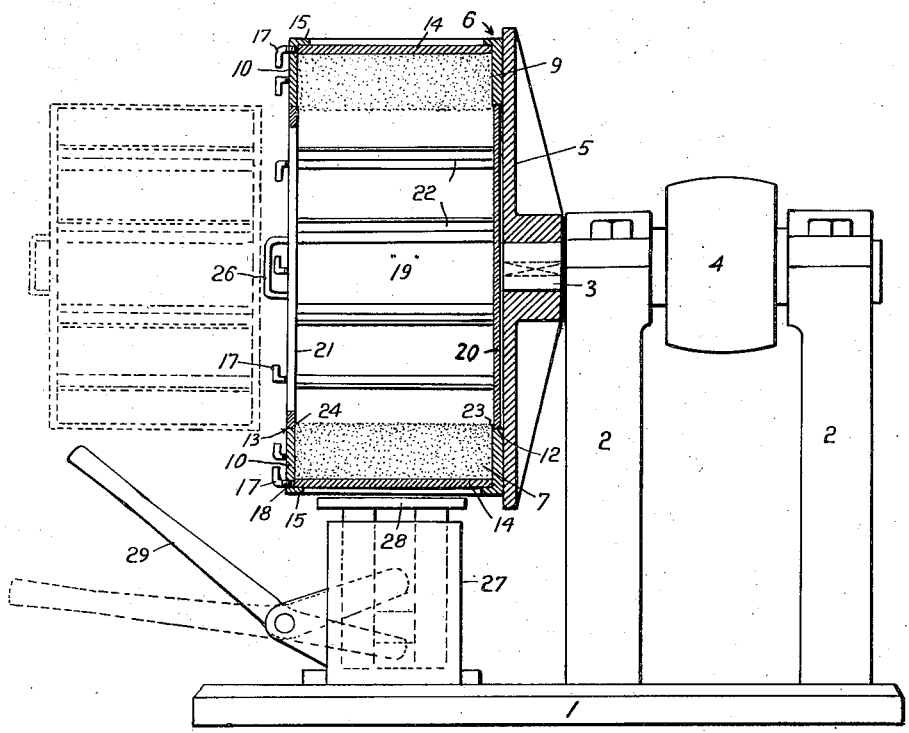
Fig. 3 is a sectional elevation on line 3—3, Fig. 2.
Figure 4:
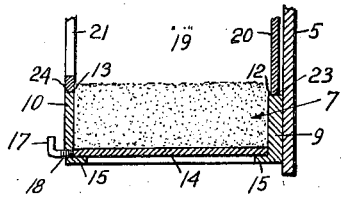
Figs. 4 and 5 are sectional detail views showing the production of a moulded block.

Subsequently, the screed means can be removed from the chamber 19 (Fig. 3), when the radial arm 30 can be placed in disengaged position thereof in relation to the frame 6 if this has not already been done. Pawl 34 can then be placed to engage one by one with the V-shaped recesses 16 of the frame 6, and thus the separate mould boxes 7 can be brought into alignment with the plunger 28 of the ejector 27.

Figure 5:
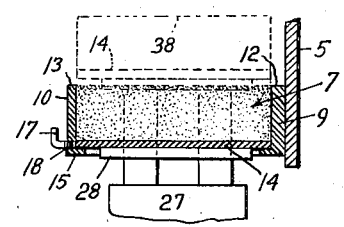

Upon the clamping screws 17 having been removed from engagement with the pallets 14 the latter are free to be moved upwardly in their respective mould boxes 7. When the lever 29 is depressed (Fig. 3), the pallet 14 and block 38 made of plastic material will be raised clear of the open end of the mould box 7, as shown by dotted lines, Fig. 5. Both the upraised pallet 14 and block 38 are now removed from the apparatus, when the block 38 can be separated from the pallet 14 which can then be replaced in its mould box 7 and clamped therein by its co-operative screw 17.

The moulds used may be designed to allow for manufacture of articles, say slabs, blocks, pipes, or other articles, and whether these be intended for sound deadening and/or heat insulating purposes or not.

If the moulded articles are to have sound deadening and/or heat insulating properties, the moulds may have fed thereto cement concrete consisting of one part of Portland cement to two parts of sand or fine aggregate and two parts of crushed stone or other coarse aggregate. The thickness of such cement concrete in the moulds may be as desired. Such layer of concrete having been levelled has superimposed thereon in the moulds a second layer of cement concrete containing one part of Portlant cement to six or more parts of fine aggregate material which may be composed of pumice, haydite or coke breeze or other suitable fine aggregate material. The said second layer of cement concrete is filled into the moulds to the top thereof. The said first layer of cement concrete fed to the moulds is adapted to serve as a protective surface to the said second layer of cement concrete fed to the moulds, which latter layer is adapted to give to the articles sound and/or heat insulating properties.

Re-filling of the separate moulds 7 with new plastic material for repeating centrifugal moulding operations on the apparatus can be effected after discharge of moulded articles from the moulds 7.

What I claim as my invention and desire to secure by Letters Patent is:

1. A centrifugal molding machine comprising a shaft and an annular frame rotatable thereon, a plurality of molds formed integrally with said frame, said molds opening into the interior of said frame, the edges of the molds facing the axis of the frame being substantially even with the annular walls of said frame, an annular frame insertable into the interior of said first frame and arranged in contact with each mold within said frame, said second frame having a screed serving to simultaneously remove excess material from each of the filled molds as the second frame is withdrawn from said first frame.

2. A machine according to claim 1, in which the first annular frame is polygonal in shape, and in which the second insertable cooperating frame is of corresponding polygonal shape.

3. A machine according to claim 1, in which the first frame comprises annular end plates connected by bridging members, the annular plates forming the end walls of the molds and the bridging mmebers forming the side walls of the molds.

4. A machine according to claim 1, in which portions of said frame have flanges, the molds having pallets, the pallets being removable and resting on said flanges, and adjustable clamping means on said frame for securing said pallets in said molds.

5. A machine as claimed in claim 1, in which the molds present an interrupted surface on the outer periphery of the frame and the machine is provided with a support having a radial arm pivoted thereto, said arm being frictionally and yieldably engageable with said interrupted surface on said frame, and spring means for retaining said arm in engagement with said surface, thereby giving vibrating action thereto to impart concussion to the material in the molds.

6. A machine according to claim 1, in which the insertable frame comprises spaced annular rings corresponding in shape to the annular lateral opening of the first frame, said rings being connected by spaced angle members, said angle members being so constructed and arranged as to rest upon the adjacent inner longitudinal edges of the side walls of the molds, and to slide on said edges during the insertion and removal of said insertable frame.

7. A machine according to claim 1, in which recesses are formed between the molds on the outer periphery of said annular frame, and in which means on the machine are insertable into recesses to lock said frame against rotation.

8. A machine according to claim 1, including a base and a press on the base, said press being disposed between the annular ends of said frame, means adjacent said press for locking said frame with a mold in alignment with said press, said press being operable to eject a molded article from said mold.

RALPH WILLIAMS.

REFERENCES CITED

The following references are of record in the file of this patent:

UNITED STATES PATENTS

| Number | Name | Date |
| --- | --- | --- |
| 125,272 | Clark | Apr. 2, 1872 |
| 1,626,447 | Bramin | Apr. 26, 1927 |
| 1,954,904 | Walter | Apr. 17, 1934 |
| 2,052,061 | Toelke | Aug. 25, 1936 |